United States Patent [19]
Sung

[11] Patent Number: 6,039,641
[45] Date of Patent: Mar. 21, 2000

[54] BRAZED DIAMOND TOOLS BY INFILTRATION

[76] Inventor: Chien-Min Sung, No. 4, Lane 32, Chung-cheng Rd., Tansui, Taipei County, Taiwan

[21] Appl. No.: 08/835,117

[22] Filed: Apr. 4, 1997

[51] Int. Cl.[7] .................................................. B24D 3/06
[52] U.S. Cl. .......................... 451/540; 451/542; 125/22; 51/295; 51/307
[58] Field of Search .................................. 451/540, 542; 125/22, 21; 51/307, 309, 295; 175/435, 434, 420.2

[56] References Cited

U.S. PATENT DOCUMENTS

| | | | |
|---|---|---|---|
| 4,669,522 | 6/1987 | Griffin | 164/97 |
| 4,780,274 | 10/1988 | Barr | 419/7 |
| 5,000,273 | 3/1991 | Horton et al. | 175/329 |
| 5,518,443 | 5/1996 | Fisher | 451/542 |

*Primary Examiner*—Robert A. Rose
*Attorney, Agent, or Firm*—Thorpe North & Western, LLP

[57] ABSTRACT

The present invention describes a diamond tool with diamond bonded chemically by a braze that contains either Cr, Mn, SI, or Al or mixtures or alloys thereof. The diamond tool is made by infiltrating the braze into a matrix metal that contains diamond in either form of grits or polycrystalline bodies.

18 Claims, 5 Drawing Sheets

BRAZED DIAMOND TOOLS BY INFILTRATION

BACKGROUND OF THE INVENTION

1. Field of the Invention

The present invention relates to tools having diamond particles formed thereon/therein, wherein the diamond particles are chemically bonded to matrix support material used to hold the diamond in place. More specifically, the diamond grit is bonded chemically in a matrix powder by a braze that can wet diamond. These tools are manufactured by the infiltration of the molten braze into a preform of matrix that contains diamond particles, thereby securing the diamond in place by a chemical bond.

2. State of the Art

Abrasive tools have long been used in numerous applications, including cutting, drilling, sawing, grinding, lapping and polishing materials. Because diamond is the hardest abrasive material, it is widely used as a superabrasive on saws, drills, and other devices which utilize the abrazive to cut, shape or polish other hard materials. The total value of such tools consumed in 1996 was over 5 billion dollars (U.S.). More than half of the these tools were consumed in sawing applications such as cutting stones, concretes, asphalts, etc.

Diamond coated tools are particularly indispensable for applications where other tools lack the hardness and durability to be practical substitues. For example, in the stone industry, where rocks are cut, drilled, and sawed, diamond tools are about the only type which are sufficiently hard and durable to make the cutting, etc., economical. If diamond tools were not used, many such industries would be economically infeasible. Likewise, in the precision grinding industry, diamond tools, due to their superior wear resistance, are uniquely capable of developing the tight tolerances required, while simultaneously withstanding wear sufficiently to be practical.

Despite the prevailing use of diamond tools, these tools have suffered from several significant limtations which have placed unnecessary limits on the useful life of the tools. One such drawback is that the diamond grit is not attached to the matrix support material in a sufficiently stong attachment to maximize useful life of the cutting, drilling, polishing, etc., body. In fact, in most cases diamond grit is merely mechanically embedded in the matrix support material. As a result, diamond grit is often knocked out or pulled out prematurely during use. Moreover, the grit may receive inadequate mechanical support form the loosely bonded matrix under work conditions. Hence, the diamond particles could be shattered by the impact of the tool against the piece to which the abrasive, etc., is applied.

It has been estimated that in a typical diamond tool, less than about one tenth of the grit is actually consumed in the intended application—i.e. during actual cutting, drilling, polishing, etc. The remainder of the diamond grit is either wasted by being leftover when the tool's useful life has expired, or is wasted by being pulled-out or broken during use due to poor attachment and inadequate support. Most of these diamond losses could be avoided if the diamond particles can be properly positioned in and firmly attached to the surrounding matrix.

Furthermore, to ensure that the diamond grit is mechanically held sufficiently to remain in place, it must be buried deep in the matrix to prevent it from falling out or being knocked free of the tool body during use. As a result, the protrusion of the diamond particle above the tool surface is insufficient. The low grit protrusion limits the cutting height for breaking the material to be cut. These limitations, in turn, limit the cutting speed of the cutting tool. If the diamond grit could be held more securely in the matrix, it could protrude higher from the matrix. The greater cutting depth would allow increased cutting speed and a greater useful life for the product. Moreover, due to the lower friction between the workpiece and the tool matrix, the power required for cutting, drilling, etc., may also be reduced.

In order to anchor diamond grit firmly in the matrix, it is highly desirable for the matrix to form a carbide around the surface of the diamond. The chemical bond so formed is much stronger than the traditional mechanical attachment. The carbide may be formed by reacting diamond with a suitable carbide former such as a transition metal. Typical carbide forming transition metals are: titanium (Ti), vanadium (V), chromium (Cr), zirconium (Zr), molybdenum (Mo), and tungsten (W).

The formation of a carbide requires that the carbide former be deposited around the diamond and that the two subsequently be caused to react to form a carbide. Moreover, the non-reacted carbide former must also be consolidated by sintering or other means. All these steps require treatment at high temperatures. However, diamond may be degraded when exposed to a temperature above 1,000° C. The degradation is due to either the reaction with the matrix material or the development of microcracks around metal inclusions inside the crystal. These inclusions are trapped catalysts used to synthesize the diamond.

Most carbide formers are refractory metals so they may not be consolidated below a temperature of about 1,200° C. Hence, refractory carbide formers are not suitable as the main constituent of the matrix support material.

There are, however, some carbide formers that may have a lower sintering temperature, such as manganese (Mn), iron (Fe), silicon (Si), and aluminum (Al). However, these carbide formers may have other undesirable properties that prohibit them from being used as the primary constituent of the matrix support material. For example, both manganese and iron are used as catalysts for synthesizing diamond at high pressure (above 50 Kb). Hence, they can catalyze diamond back to graphite during the sintering of the matrix powder at a lower pressure. The back conversion is the main cause of diamond degradation at high temperature.

Aluminum, on the other hand, has a low melting point (660° C.), thus, making it easy to work with for securing the diamond particles. However, the melting point of aluminum can be approached when a diamond grit is cutting aggressively. Hence, aluminum may become too soft to support the diamond grit during the cutting operation. Moreover, aluminum tends to form the carbide $Al_4C_3$ at the interface with diamond. This carbide is easily hydrolyzed so it may be disintegrated when exposed to coolant. Hence, aluminum typically is not a suitable carbide former to bond diamond in a matrix.

To avoid the high temperature of sintering, carbide formers, such as tungsten, are often diluted as minor constituents in the matrix that is made primarily either Co or bronze. During the sintering process, there is a minimal amount, if any, of liquid phase formed. The diffusion of carbide former through a solid medium toward diamond is very slow. As a result, the formation of carbide on the surface of diamond is negligible. Therefore, by adding a carbide former as a minor matrix constituent, the improvement of diamond attachment is marginal at the best.

In order to ensure the formation of a carbide on the surface of diamond, the carbide former may be coated onto the diamond before mixing with the matrix powder. In this way, the carbide former, although it may be a minor ingredient in the matrix, can be concentrated around diamond to form the desired bonding.

The coating of diamond may be applied chemically or physically. In the former case, the coated metal is formed by a chemical reaction, generally at a relatively high temperature. For example, by mixing diamond with a carbide former such as titanium or chromium, and heated the mixture under a vacuum or in a protective atmosphere, a thin layer of the carbide former may be deposited onto the diamond. The thickness of the coating may be increased by increasing temperature. The deposition rate may also be accelerated by adding a suitable gas (e.g., HCl vapor) that assists the transport of the metal. For example, Chen and Sung (U.S. Pat. No. 5,024,680) describes such a coating process.

Alternatively, the coating may be performed in a molten salt. For example, U.S. Pat. No. 2,746,888 describes a method of coating a thin layer of titanium over diamond in a molten salt of chlorides.

A commonly used chemical method for coating diamond is chemical vapor deposition (CVD). In this case, the deposited metal is produced by the reaction of gases at a high temperature. Thus, U.S. Pat. No. 3,520,667 describes a technique to deposit a thin layer of silicon (Si) onto the surface of diamond. The temperature of this deposition is high enough so silicon carbide is formed instantaneously at the interface.

In order to prevent diamond from possible degradation by exposure to high temperatures, coating is produced at the lowest temperature possible. However, coating often becomes too thin when deposited at a low temperature. For example, the coating produced by a typical chemical method is about one micrometer thick. There are some commercial diamond grits that contain such thin coatings. For example, General Electric Company offers a saw grit that may be coated with a thin coating of either titanium or chromium.

However, when the thin coating is exposed to a high temperature, such as that which may be encountered during the sintering process, it can be easily oxidized in the atmosphere, or dissolved into the matrix metal. Thus, although a significant benefit is claimed for such commercially coated products, typically a ⅓ improvement in tool life, the ability for the thin coating to survive the manufacturing process is debatable.

In order to protect the thin metal coating, multiple layers of coating may be applied. Thus, U.S. Pat. Nos. 5,232,469 and 5,250,086 described a second layer made of nickel, or another non-carbide former. The second layer may be deposited by an electroless process that is performed at a lower temperature. For more layers, Chen and Sung (U.S. Pat. Nos. 5,024,680 or 5,062,865) describe a diamond grit with three layers of coating. In this case, the inner most layer is made of chromium, and it is overlaid by a secondary metal layer such as titanium. The double layers are further wrapped in a third overcoat of a material such as tungsten. However, such a complicated coating system may be too costly to be econimically feasible in the production of many cutting, drilling or polishing tools.

Alternatively, a chemical coating may be deposited relatively thick by a CVD method. For example, Sung, et al. (U.S. Pat. Nos. 4,943,488 or 5,116,568) describes a fluidized bed system that can coat diamond with tungsten of a few tens of micrometers. But again, such a coating is expensive, and its application has not been widely used.

In contrast to chemical methods, a physical method may be inexpensive. Moreover, it may deposit a thick metal coating onto diamond at a very low temperature. For example, the author evaluated "Metal Coating of Saw Diamond Grit by Fluidized Bed" (see p 267–273 of Fabrication and Characterization of Advanced Materials, edited by S. W. Kim and S. J. Park of The Materials Research Society of Korea 1995). The coating system is based on the method as described in U.S. Pat. No. 4,770,907 (a similar concept is disclosed in U.S. Pat. No. 5,143,523 or European Patent No. 0 533 443 A1). However, such a method, like many other similar processes, often produces coatings with different thickness. Moreover, only very fine (<5 micrometers) metal powders can be coated effectively onto the surface of diamond. Hence, although physical methods may be used to coat a diamond grit with an alloy that contains a carbide former, their benefits are limited.

When diamond is coated mechanically by a metal powder, as described in the above example, the powder is held loosely by an organic binder (e.g., PVA, or PEG). Such a coating may be easily rubbed off during the subsequent treatments, e.g., mixing or pressing. Although heat treatment may increase the mechanical strength of the coating, it may not consolidate the coating to the full density. A porous coating lacks the mechanical strength necessary to support a diamond grit that is impacted repeatedly during the cutting operation.

Carbide formers may also be diluted in an alloy. If the alloy can melt below 1100° C., it may be used to braze the diamond without causing much degradation of the latter. Many diamond brazes are known in the art. Most are based on Group Ib solvents (copper, silver and gold) that contain one or more carbide formers, e.g., gold-tantalum (Au—Ta), or silver-copper-titanium (Ag—Cu—Ti). These brazes, however, are typically too expensive for commercial use. Moreover, they are soft and unsuitable as ingredients for the matrix support material of diamond tools.

There are some high temperature filler metals that may be used to braze diamond. Such brazes may be hard enough to hold a diamond grit in place during cutting. For example, U.S. Pat. Nos. 3,894,673 and 4,018,576 describe diamond tools made by brazing a hard facing alloy that contains nickel-chromium (Ni—Cr) as the major constituent. However, these brazed diamond tools, although useful, are generally limited as surface set tools that contains only one layer of diamond. Such tools may not last when they are used to cut highly abrasive materials, e.g., granite. Moreover, the braze in these tools, in addition to holding the diamond, must also serve as the hard facing. The compromise of these dual-functions may not always be possible as the optimal wear resistance of the tool surface may need to be adjusted for specific applications.

Alternatively, a diamond bonding alloy may be used to infiltrate a high concentration (i.e greater than 40% by volume) of diamond particles. Thus, Chen and Sung (U.S. Pat. Nos. 5,030,276 or 5,096,465) describe such a product and the process of making the same. However, the infiltration is very difficult due to the high concentration of diamond. Moreover, such products have limited applications, such as a drill bit. They are not applicable for most applications that require a lower concentration (i.e., less than 40% by volume) of diamond, such as saw blades and grinding wheels.

The hard facing alloys may also be used as the matrix support material. For example, U.S. Pat. No. 4,378,975 describes a method to coat diamond with a very thin layer of chromium, and subsequently palletizing the coated grit with a nickel-chromium alloy. The palletized particles are then consolidated by sintering the alloy. However, as the consolidation process is taking place primarily in a solid phase, the bonding of matrix and diamond may not be sufficient.

In addition to sintering, infiltration is also a common technique for making diamond tools, in particular for drill bits and other specialty diamond tools that contain a large (i.e. greater than U.S. mesh 30/40) diamond grit. For example, U.S. Pat. No. 4,669,522 describes a process to infiltrate a rotary drill bit with a copper alloy at a temperature lower than 850° C. (preferably 750° C.). Most commonly used infiltrants for these tools are copper based alloys. These infiltrants must flow and penetrate the small pores in the matrix powder. In order to avoid the diamond degradation at high temperature, the melting point of the infiltrant must be low. Hence, the infiltrant often contains a low melting point constituent, such as zinc (Zn). In addition to lowering the melting point of the infiltrant, the low melting point constituent also reduces the viscosity so the infiltrant can flow with ease. However, as most carbide formers tend to increase the melting point of the infiltrant, they are excluded from most infiltrants. As a result, these infiltrants cannot improve the bonding of diamond.

Some infiltrants do contain a carbide former that may facilitate the bonding of diamond. U.S. Pat. No. 5,000,273 describes an abrasive tool that is produced by infiltrating a matrix powder with an alloy that contains the major constituents of copper, manganese and zinc. However, as discussed above, zinc is added to increase the fluidity of the infiltrant, and it may not be suitable for making certain products that is produced under different environments. For example, if infiltration is performed under a vacuum, zinc may be vaporized. As a result the remaining alloy may become too viscous to infiltrate completely the matrix powder.

Thus, there is a need for an improved method of infiltrating the matrix powder to bond the diamond thereto. Such a method should be able to be accomplished at a sufficently low temperature to avoid potential damage to the diamond. Additionally, such a method should be designed to improve the bonding of the diamond to the matrix support material.

SUMMARY OF THE INVENTION

It is an object of the present invention to provide an improved method for forming tools having diamond particles disposed therein/thereon.

It is another object of the present invention to provide such a method wherein the diamond particles are disposed in a matrix support material, and then the matrix support material infiltrated with a braze to bond the diamond particles to the matrix support materials.

It is yet another object of the present invention to provide such a method wherein the brazing occurs at sufficiently low temperatures to prevent thermal damage to the diamond particles.

It is still another object of the present invention to provide such a method wherein the matrix support material is specifically selected to provide numerous pores through which the brazing material may flow and thereby facilitate chemical bonding of the diamond and matrix support material.

It is still yet another object of the present invention to provide such a method wherein the diamond particles are disposed in the matrix support material in some predetermined pattern, to thereby lengthen the useful life of the tool to which the diamond and matrix support material are attached.

The above and other objects of the invention are realized in specific illustrated embodiments of a novel method for forming brazed diamond tools, and for tools made by the novel method. The method includes forming a sheet of matrix support material, and then disposing a plurality of diamond particles in the matrix support material. Preferably, the amount of diamond particles to matrix support material is preferably less than 50 percent, and most preferably less than 40 percent. The diamond impregnated sheet is then infiltrated by a braze which is capable of wetting the diamond, so as to form a chemical bond with the diamond. The braze also bonds to the matrix support material, thereby creating a chemical bond connecting the diamond to the matrix support material, rather than relying on a simple mechanical attachment in accordance with the prior art. Although the technique is most suitable for making saw blades, its applications can extend to all diamond tools.

In accordance with one aspect of the present invention, the matrix support material may be made of common metal powder. Examples of such metal powder are cobalt, nickel, iron, bronze or their alloys or mixtures (e.g. tungsten or its carbide). After formation of the matrix support material material is then infiltrated by a diamond braze, such as Nicrobraz L. M. (made by Wall Colmonoy Company), either under a vacuum, typically about $10^{-5}$ torr, or in an inert atmosphere (e.g., argon (Ar) or nitrogen ($N_2$)) or a reducing atmosphere (e.g., hydrogen ($H_2$)). The braze, thus, facilitates bonding between the diamond particles and the matrix support material.

In accordance with another aspect of the present invention, the matrix support material is formed by course metal powder (i.e. greater 400 mesh U.S. or 34 microns) While conventional methods require the density of the green body be as high as possible so subsequent sintering can proceed rapidly, it has been found in accordance with the present invention, that it is preferable to use a precursor with a lower packing density to allow the easy flow of the diamond braze. In some situations, the porosity of the precursor body may be intentionally increased by using irregularly shaped matrix particles. This preference is again contrary to the conventional wisdom that requires the particles be as spherical as possible so the packing density can be increased.

In accordance with yet another aspect of the present invention, the diamond particles are placed in a predetermined pattern within the matrix support material, and the diamond impregnated matrix support material is then impregnated with the diamond braze to promote chemical bonding of the diamond material. The predetermined pattern may be substantially planar, i.e. the diamond placement may be controlled by the use of a template, or may be substantially vertical, with channels being formed in the matrix support material to receive diamond particles, which are then infiltrated with the diamond braze.

In accordance with still yet another aspect of the present invention, the matrix support material may contain minor ingredients to enhance certain properities. For example, hard materials such as tungsten, tungsten carbide and silicon carbide may be added to increase wear resistance. Soft materials, such as molybdenum sulfide, copper, and silver, may also be added as solid lubricants.

The supportive material may be prepared by a conventional method. For example, the powder may be mixed with diamond grit thoroughly. An organic binder (e.g., PVA or PVB) may be added to hold the mixture. The mixture is then cold pressed to form the desirable shape (e.g., a saw blade).

The precursor is then ready to be infiltrated by a suitable diamond braze.

As discussed, a fine matrix powder used for conventional tools may hinder the infiltration of the diamond braze. Moreover, it would react excessively with the braze so the melting temperature of the braze is raised. As a result, the infiltration may not be complete.

Alternatively, the mixture may be processed following the teaching of applicant's other, copending patent application (U.S. patent application, Ser. No. 08/832,852 (identified as attorney docket no. T5100), filed Apr. 4, 1997). For example, the powder blend of the supportive material may be cold rolled to form a sheet. The sheet can then be punched out with a desirable shape (e.g., a saw segment) (See FIG. 1). Several such punched segments may be assembled to form the precursor (see FIGS. 2,3,4) for infiltration. As described in the pending patent application, by assembling substantially two-dimensional segments to form a three-dimensional body, the distribution of diamond grit in a tool can be positively controlled. Thus, diamond concentration in different parts of the same tool may be adjusted (see FIGS. 1A through 4). Such a control of diamond distribution is highly desirable to improve the wear characteristics of the tool. For example, the sides of a diamond saw blade are often worn faster then the center, so it is advantageous to add more diamond grit on on the sides (see FIG. 1B).

Current applications require the matrix support material to serve dual functions: to provide the mechanical support of the tool, and to hold the diamond grit in the matrix. These two functions often demand contradictory properties. For example, as the mechanical support, the matrix support material must be strong and wear resistant (e.g., cobalt, or bronze mixed with tungsten carbide). However, the material with good mechanical support is often ineffective to adhere the inert diamond. On the other hand, a braze alloy (e.g., silver-copper-titanum alloys) may hold diamond firm, but are too soft to provide the mechanical support for the tool body. Thus it is desirable to separate these two functions of the matrix support material by using a composite material. In this case, the framework of the composite material is optimized for mechanical support, yet the filler material is designed to hold the diamond.

The composite material may be made by using coated diamond as discussed above. In this case, a diamond braze may be used to coat the diamond grit first and the coated grit is subsequently mixed in the matrix powder. However, the coating incurs an additional cost. Moreover, most diamond brazes are not in a powder form. Even if they were, it is very difficult to coat these brazes uniformly onto the diamond grit. As a result, coated diamond grit is seldom used today in making diamond tools.

The present invention makes the composite matrix support material by infiltrating a diamond braze into a supporting material that contains diamond grit. The braze includes carbide formers such as chromium, manganese, silicon and aluminum, while avoiding volatile metals such as zinc, lead and tin.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1A:
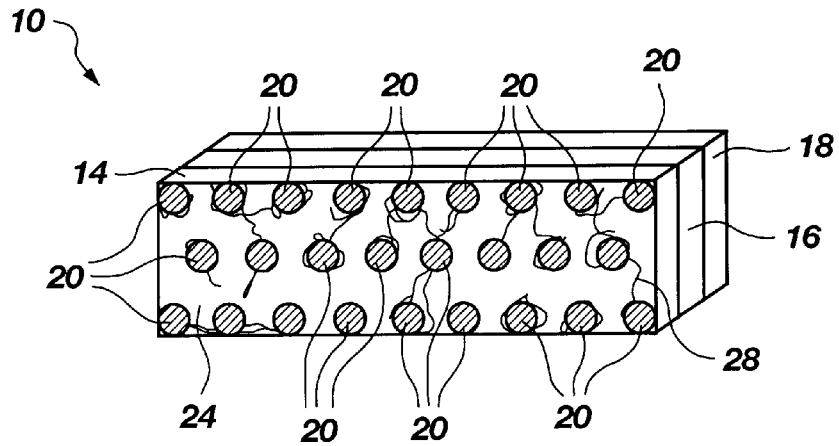
FIG. 1A shows a segment from a superabrasive tool formed by a plurality of linear, longitudinal layers disposed adjacent one another to form a three-dimensional superabrasive member.

Referring to FIG. 1A, there is shown a perspective view of a segment, generally indicated at 10, formed by a plurality of layers, 14, 16 and 18. Each of the layers 14, 16 and 18 is formed by matrix support material 24 impregnated with diamond particles, indicated by the dark circles 20, and has been infiltrated with a braze 28 selected to bond to the diamond particles and the matrix support material. Preferably, the diamond particles 20 constitute less than 50 percent of the matrix support material—diamond mixture, and more preferably less than 40 percent. Keeping the amount of diamond particles to the minimum helps to minimize cost while optimizing the useful life of the product.

Preferably, the diamond braze contains at least 3% by weight of a member selected from the group consisting of chromium, manganese, silicon and aluminum, and alloys and mixtures thereof. Additionally, the diamond braze should have a liquidus temperature of less than 1,100° C. to avoid damage to the diamond during the brazing process.

As discussed in U.S. patent application, Ser. No. 08/832, 852 (Attorney Docket No. T5100), which is expressly incorporated herein, forming the segment 10 in a plurality of thin layers provides remarkably improved control over the distribution of the diamond particles 20. By controlling the distribution of the diamond particles 20 within each layer and then combining layers, a three-dimensional segment can be formed in which distribution of the diamond particles is controlled in each dimension. This, in turn, enables the formation of segments which are particularly adapted to the likely use of the segment, be it for polishing, cutting, grinding, etc. By tailoring the distribution and concentration of the superabrasive particles whithin the segment 10, more precise control is given over performance of the tool under actual working conditions.

The present invention further improves the above technique by infiltrating the matrix support material 24 with a braze 28 which is selected to chemically bond to the diamond particles and to the matrix support material. Thus, while the placement of the diamond particles shown in FIG. 1A is a marked improvement over the prior art, an additional increase in the segment's 10 useful life is obtained by utilizing a braze to form a chemical bond, rather than merely relying on mechanical retention of the diamond particles.

Figure 1B:
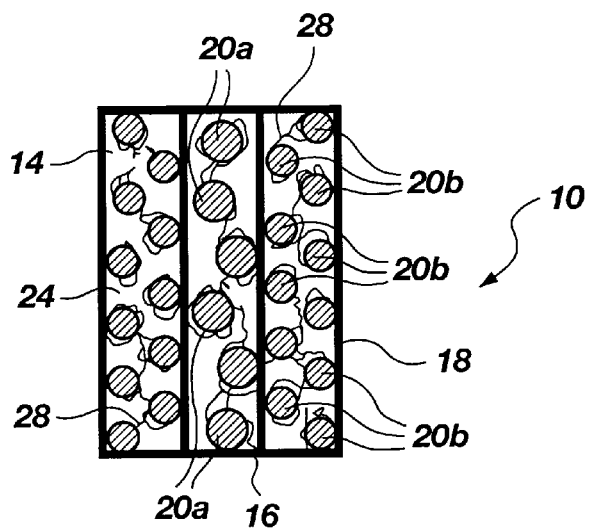
FIG. 1B shows a cross-sectional view of one typical configuration of the tool segment shown in FIG. 1A, wherein a layer formed by a matrix support material and a relatively large superabrasive is sandwiched between two layers of matrix support materials which have smaller grit and higher concentration of the abrasive.

Likewise, the selective placement of differening sizes of diamond particles can used to form a cutting segment formed to resist premature wear to the sides of the segment, thereby extending the cutting segment's useful life. Referring specifically to FIG. 1B, there is shown a cross-sectional view of the cutting segment 10 of FIG. 1A. Unlike the cutting segments of the prior art, the cutting segment 10 is formed of three layers, 14, 16 and 18 respectively. The middle layer 16 has a plurality of superabrasive particles 20*a* which are of a first size (e.g. 40/50 mesh) and a first concentration. The outer layers 14 and 18, in contrast, have a plurality of superabrasive particles 20*b,* which are of a second size (e.g. 50/60 mesh) smaller than the first size, and in a second concentration typically greater than that present in the middle layer 16. The smaller, more densely distributed superabrasive particles 20*b* provide the outer layers 14 and 18 with a greater resistance to wear as they cut through concrete, rock, asphalt, etc. Because the outer layers 14 and 18 are more resistant to wear, the cutting segment 10 resists formation of a convex outer surface, as has traditionally occured with cutting elements. By maintaining a more planar cutting surface, the cutting segment is able to maintain a straight cutting path so it can cut more efficiently with a longer userful life.

Furthermore, an additional increase in useful life is obtained by infiltrating the matrix support material 24 with a braze 28 formed from chromium, manganese, silicon, and/or aluminum, or an alloy or mixture thereof. While a wide variety of quantities of these materials may be used, it has been found that it is preferable if the chromium, manganese, silicon or aluminum or alloy or mixture in the diamond braze constitutes at least 3 percent of the braze by weight (and more preferably 5 percent). The braze 28 fills the pores in the matrix support material 24, which is typically powder selected from the group including iron, cobalt, nickel or alloys or mixtures thereof.

Figure 2A:
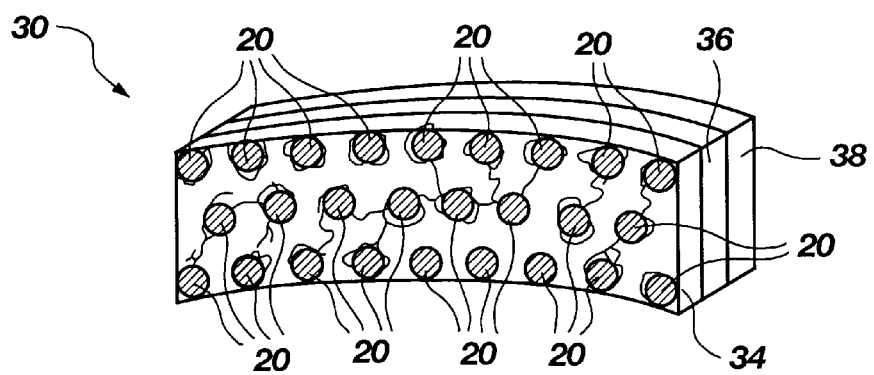
FIG. 2A shows a segment from a superabrasive tool formed by a plurality of arcuate, longitudinal layers which are attached to one another to form a three-dimensional superabrasive member.

Another advantage to the use of multiple layers of matrix with diamond or some other superabrasive particle disposed therein is that the layers are easily formed into other desirable shapes for the cutting, drilling, grinding, etc., segment. For example, FIG. 2A shows a perspective view of a segment, generally indicate at 30, of a superabrasive tool formed by a plurality of arcuate, longitudinal layers which are attached to one another to form a three-dimensional superabrasive member which has been infiltrated with the braze 28 to thereby hold the diamond within the member. The segment 30 is formed from first, second and third layers, 34, 36 and 38, which are each arcuate. When the three are joined together, an arcuate segment 30 is created. Such a segment, of course, may be used on cutting tools which are non linear, and on other types of tools for which a nonlinear superabrasive segment is desired. Because the layers 34, 36 and 38 are initially formed independent of one another, they are much easier to conform to a desired shape, and are able to do so while the brazed diamond particles 20 disposed therein are held in their predetermined positions.

Figure 2B:
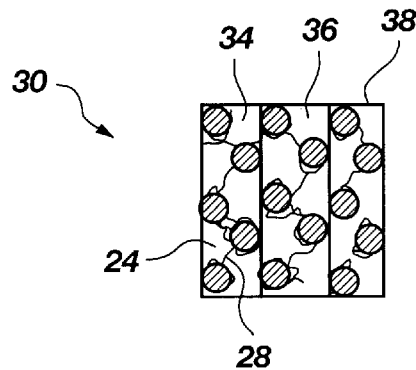
FIG. 2B shows a cross-sectional view of a plurality of layers matrix support material as may be used with the segment shown in FIG. 2A.

Referring now to FIG. 2B, there is shown a cross-sectional view of a plurality of the layers 34, 36 and 38 of the segment 30. Of course, the configuration of the diamond particles may be used with the segment shown in FIG. 1A or that shown in FIG. 2A. Unlike the embodiment of FIG. 1B, the layers are each provided with the same size and concentration of the diamond particles 20. However, because the spacing is substantially uniform, there is no underspacing or overspacing between the superabrasive particles, and the segment 30 wears more evenly than the segments of the prior art with randomly spaced particles. The more even wear prevents premature failure of the segment 30, and thus extends the life of the tool while keeping the amount of superabrasive used to a minimum. Furthermore, the braze 28 which bonds to the diamond particles and the matrix 24 futher strenthens each layer and prevents loss of the diamond particles 20.

Figure 3:
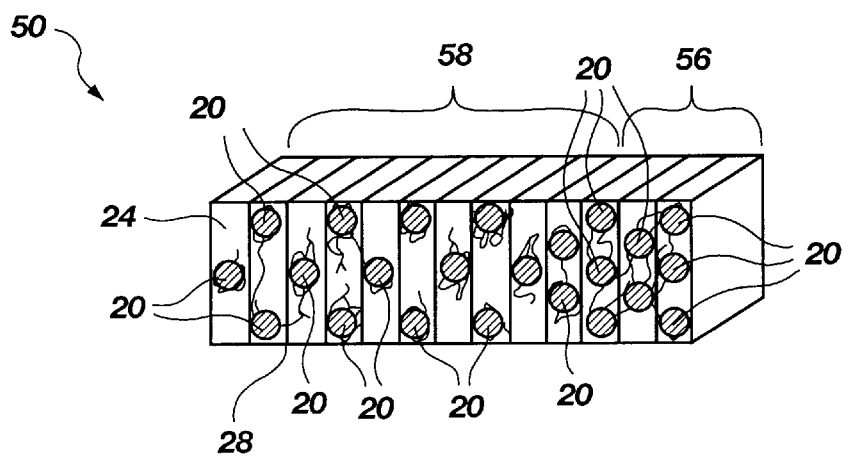
FIG. 3 shows another possible layout of a segment of a cutting tool with transverse layers configured with a denser concentration of abrasive material disposed at a forward, cutting end of the three-dimensional superabrasive member.

FIG. 3 shows another possible embodiment of a segment 50 made in accordance with the teachings of the present invention. The layered structure in a diamond segment may also be assembled transversely or horizontally, and the braze 28 may be applied to every layer, or to select layers as shown in FIG. 3. Thus, the segment 50 in FIG. 3 is formed from a plurality of transverse layers, generally indicated at 54. A first plurality of layers (i.e. the first four layers), indicated at 56, are provided with a first concentration of diamond particles 20 which are brazed to bond to the matrix support material 24. A second plurality of layers (i.e. the remaining 9 layers), indicated at 58, are provided with a second concentration, less than the first concentration and are also brazed to bond to the matrix support material 24.

Many cutting tools are configured such that the cutting segment 50 is provided with a lead edge which performs a majority of the cutting and which recieves most of the impact force when contacting the surface to be cut. For example, a circular saw blade will usually have a plurality of teeth or segment, each tooth having a leading edge which takes the force of the cutting. Because the leading edge preforms a significant portion of the cutting, it is much more susceptible to wear than are rotationally rearward portions of the tooth. When formed in accordance with the prior art, the teeth, however, often had relatively consistent abrasive disposed thereon. Over time the leading edge wears significantly, but the other portions coated with diamond particles are subjected to minimal wear. Eventually, the abrasive is worn off the leading edge, while significant amounts remain on the other portions of each tooth. Thus, a considerable amount of superabrasive is wasted when the blade is disgarded. The embodiment of FIG. 3 is specifically configured to overcome such concerns. The layers 56 and 58 are configured to provide substantially even wear accross the cutting segment 50 by placing a larger percentage of the diamond particles 20 near the leading edge, than on rotationally distal portions. Additionally, brazing the diamond particles 20 in layers 56 and 58 further extends the tool life.

Figure 4:
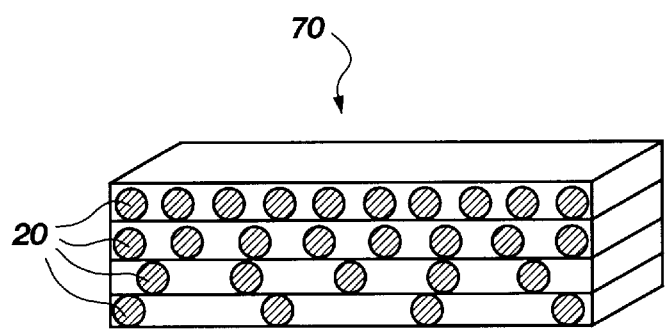
FIG. 4 shows yet another layout of a segment wherein a three-dimensional superabrasive member is formed with progressively denser abrasive distribution toward the upper surface of a tool with horizontal layers.

FIG. 4 shows yet another layout of a segment wherein a three-dimensional superabrasive member is formed with progressively denser abrasive distribution toward the upper surface of a tool with horizontal layers. As with the embodiment of FIG. 3, the controlled distribution of the diamond particles 20 forms an improved abrasive segment 70, while at the same time decreasing the cost of abrasive tools by decreasing the unnecessary consumption of diamond particles. Additionally, brazing may be used on some of the layers, while being omitted from other layers, to thereby customize the abrasive segment 70.

With routine experimentation and the teachings of the method of the present invention, those skilled in the art will be able to customize cutting, drilling, grinding, polishing and other types of abrasive segments which are specifically formed to maximize their abrasive ability (i.e. cutting, drilling, grinding, etc.) over an extended useful life, while simultaneously decreasing the amount of superabrasive which is used to form the tool.

Referring now to FIGS. 5A through 5D, there is shown one method for forming layers in accordance with the principles of the present invention. The first step of the method is to form a sheet 100 of matrix support material 104 which will be bonded to the superabrasive particles 20. The sheet 100 of matrix support material 104 can be formed from conventional powders such as cobalt, nickel, iron, copper or bronze. Additionally, for reasons which are discussed in detail below, it is highly advantageous to use coarse powders, such as those larger than 34 microns in diameter. While the use of coarse powders is inconsistent with the current teachings that it is desirable to use the finest powder available, considerable benefits may be acheived by combining coarse powder and braze to secure diamond particles in place.

There are many ways that a matrix powder can be made into the sheets 100. For example, the powder can first be mixed with a suitable binder (typically organic) and a solvent that can dissolve the binder. This mixture is then blended to form a slurry with a proper viscosity. In order to prevent the powder from agglomeration during the processing, a suitable wetting agent (e.g., menhaden oil, phosphate ester) may also be added. The slurry can then be poured onto a plastic tape and pulled underneath a blade or leveling device. By adjusting the gap between the blade and the tape, the slurry can be cast into a plate with the right thickness. The tape casting method is a well known method for making thin sheets out of powdered materials and works well with the method of the present invention.

Alternatively, the powder can be mixed with a suitable binder and its solvent to form a deformable cake. The cake can then be extruded through a die with a slit opening. The gap in the opening determines the thickness of the extruded plate. Alternatively, the material can also be drawn between two rollers with adjustable gap to form sheets with the right thickness.

It is desirable to make the sheets pliable for subsequent treatments (e.g., bending over the tool substrate). Therefore, a suitable organic plasticier can also be added to provide the desired characteristics.

The use of organic agents for powder (metal, plastics, or ceramics) processing is documented in many text books and it is well known by those skilled in the art. Typical binders include polyvinyl alcohol (PVA), polyvinyl butyral (PVB), polyethylene glycol (PEG), pariffin, phenolic resin, wax emulsions, and acrylic resins. Typical binder solvents include methanol, ethanol, acetone, trichlorethylene, toluene, etc. Typical plasticizers are polyethylene glycol, diethyl oxalate, triethylene glycol dihydroabietate, glycerin, octyl phthalate. The organic agents so introduced are to facilitate the fabrication of metal layers. They must be removed before the consolidation of metal powders. The binder removal process (e.g., by heating in a furnace with atmospheric control) is also well known to those skilled in the art.

Once the sheet 100 of matrix support material 104 is formed, a template 110 is laid on the top of the sheet. The template 110 contains apertures 114 that are larger than one abrasive particle 20, but smaller than two abrasive particles, thereby allowing a single particle of the abrasive to be disposed at each specific location.

The thickness of the template is preferably between ⅓ to ⅔ of the height of the average abrasive particle 20. However, other thicknesses may be used if appropriate accomdations are made for seating the abrasive particles in the desired locations.

After the template 110 is properly positioned, a layer of abrasive particles 20 is then spread over the template so that each apperture 114 receives an abrasive particle. Those particles not falling into the apertures 114 in the template 110 are removed by tilting the substrate, sweeping the template with a broom, or some other similar method.

Figure 5A:
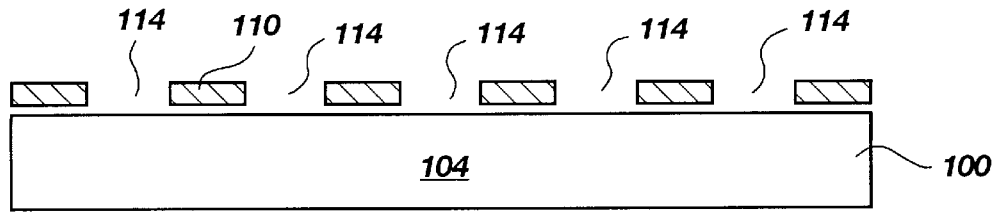
FIGS. 5A through 5D show one possible method for forming layers with controlled superabrasive distribution within the the layer.
Figure 5B:
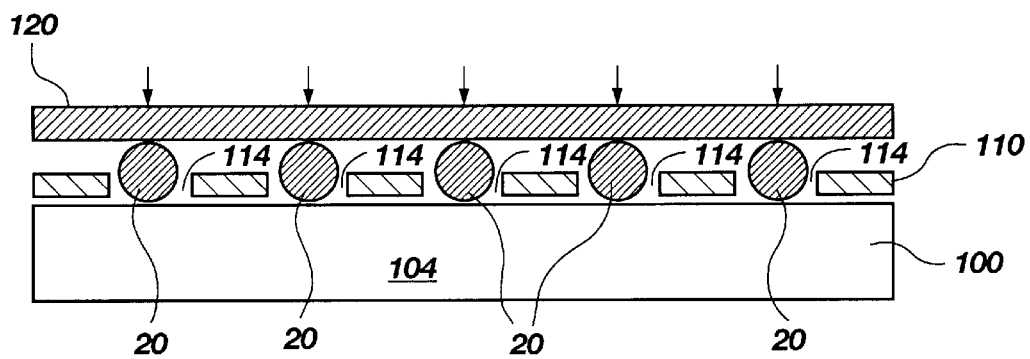

As shown in FIG. 5B, a generally flat surface 120, such as a steel plate, is then laid over the particles 20 which rest in the apertures 114 in the template 110. The flat surface 120 presses the abrasive particles 20 at least partially into the pliable sheet 100 of matrix support material 104 to seat the particles.

Figure 5C:
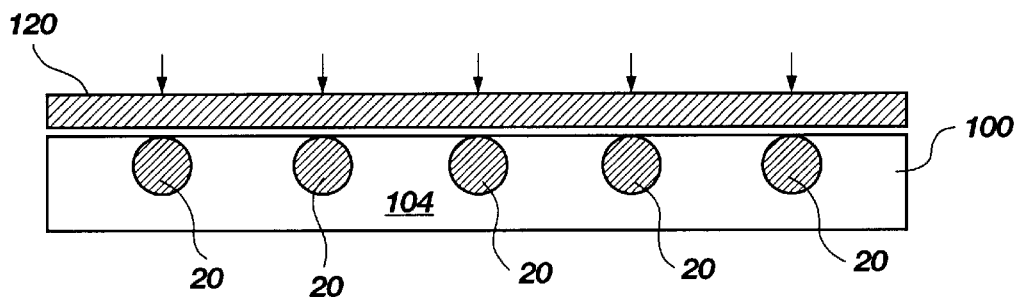

After removing the template 110, the flat surface 120 is used again to press the abrasive particles 120 firmly into the sheet 100 of matrix support material 104 as shown in FIG. 5C. While the flat surface 120 is preferable, those skilled in the art will appeciate that there may be occasions when it is desirable to have some of the abrasive particles 20 extend outwardly from the sheet 100 of matrix support material more that other abrasive particles. In such situations, a contoured or otherwise shaped surface could be used to seat some of the abrasive particles 20 deeper into the sheet 100 of matrix support material 104, than other particles.

Figure 5D:
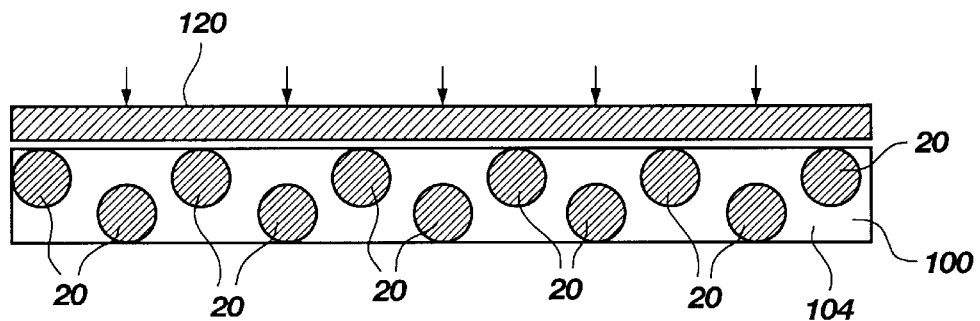

If desired, the process shown in FIGS. 5A through 5C can be repeated on the other side of the sheet 100 of matrix support material 104 (as shown in FIG. 5D), to form an impregnated layer having diamond particles 20 distributed throughout the layer in some predetermined, desired pattern. The process is typically repeated several times to obtain multiple thin layers or sheets 100 which are impregnated with the diamond particles 20. Of course, each sheet 100 need not have the same distribution pattern for the diamond particles 20, nor need the concentration of the abrasive particles be the same in each sheet.

The abrasive impregnated sheets 100 are then infiltrated with a braze which is formed with chromium, manganese, silicon or alloys or mixtures thereof. While prior art brazes typically includes metals which were designed to facilitate flow of the braze material, such as zinc, lead and tin, it has been found in accordance with the present invention that such materials actually impair the brazing process. The materials are generally more volatile, and have a tendency to contaminate the vacuum or inert atmosphere used in infiltration. While very small amounts of the volatile metals will not significantly interfere with brazing, amounts over about 1 to 2 percent can inhibit proper infiltration. As used herein, substantially free of volatile metals, or substantially free of zinc, etc. is used to characterize such a situation in which the volatile metal is present in sufficiently small amounts as to not provide any meaningful impediment to infiltration.

It is important that the infiltration temperature be kept lower than the melting point of the matrix powder so the tool body can maintain the shape during the infiltration of the diamond braze. Moreover, the brazing temperature must also be low enough to not cause diamond to degrade. In addition to control the brazing temperature, the brazing time should also be kept short so the braze will not react excessively with diamond and the matrix powder. In the former case, diamond may also be degraded. In the later case, the alloying with the matrix powder may raise the melting point of the diamond braze. As a result, the diamond braze may solidify gradually and eventually stop to flow.

The environment for infiltration also may be controlled to provide superior performance. For example, if the braze material contains a strong getter of oxygen or nitrogen, such as titanium, a high degree of vacuum ($10^{-6}$ torr maximum) must be maintained during the infiltration of the braze. On the other hand, if the braze material contains a less sensitive getter, such as chromium and manganese, a lower degree of vacuum ($10^{-5}$ torr minimum) or a hydrogen atmosphere may be adequate for the infiltration.

After the infiltration, the produced part (e.g., a saw segment) may be trimmed (e.g., by grinding) to the finished dimension. It can then be mounted (e.g., by brazing) onto a tool body (e.g., a round steel blade) to make a finished product.

As discussed above, this invention uses a diamond braze as the infiltrant that penetrates the matrix powder of a diamond tool. Most diamond brazes can wet easily common matrix powders with major constituents of cobalt, nickel, iron, copper or bronze, so the infiltration may proceed smoothly.

In contrast to a sintering process that eliminates pores in the matrix powder by consolidation, the infiltration allows the diamond braze to fill up these pores. Sintering is achieved by diffusion of atoms mainly along surfaces. In order to facilitate the sintering process the matrix powder must have large surface areas. Hence, in sintering, it is preferable to use fine powders. The fine powder can allow the sintering to proceed at a lower temperature.

The most widely used matrix powder for making diamond tools (e.g., saw segments) is cobalt powder. The standard sizes of cobalt powder for making conventional diamond tools are less than 2 micrometers. In the last decade, the diamond tool manufacturers have demanded finer and finer matrix powders. The commercial suppliers (e.g., Eurotungsten Co.) are therefore, moving toward making ultrafine (one micrometer), and even ultra-ultrafine (submicron) powders. With such a trend, the sintering temperature is continuously decreasing. A lower sintering temperature can not only reduce the degradation of diamond, it also reduces the cost of manufacturing. For example, the powder consumption is lower. Moreover, the oxidation loss of graphite mold is also minimized.

The present invention, however, uses a diamond braze to fill up the pores of the matrix powder. Hence, contrary to a conventional sintering process, coarse-sized powders, i.e. greater thant 400 U.S. mesh or 34 microns, are preferred. Moreover, while conventional methods require the density be as high as possible so sintering can proceed rapidly, the present invention prefers to use a precursor with a lower packing density to allow the easy flow of the diamond braze. In fact, sometimes, the porosity of the precursor body may be intentionally increased by using irregularly shaped matrix particles. This preference, again, is contrary to the conventional wisdom that requires the particles be as spherical as possible so the packing density can be increased.

As discussed, a fine matrix powder used for conventional tools may hinder the infiltration of the diamond braze. Moreover, it would react excessively with the braze so the melting temperature of the braze is raised. As a result, the infiltration may not be complete.

The use of a coarse matrix powder has other benefits. For example, a coarse powder can mix better with different compositions. Hence, the diamond grit may distribute more uniformly in the matrix. Moreover, a coarse powder has a smaller surface area, and hence, a lower frictional force for infiltration. Therefore, it can flow easier in the mold. Of course, a coarse matrix powder is also much less expensive, so the production cost may be reduced.

It is important to note that this invention utilizes the matrix merely as the network for holding the diamond grit in place. Hence, the matrix may not have to be made of powder. For example, the matrix body may be made of a piece of steel with openings that contain diamond grits of PCD bodies, such as that which is discussed below with respect to FIGS. 7A and 7B.

The most critical part of this invention is in the select on of a diamond braze. Although there are numerous kinds of diamond brazes, only those that meet the following requirements are applicable. Firstly, the infiltration temperature of the braze must not be so high as to cause significant diamond degradation. The temperature limit is, in general, about 1100° C. The infiltration temperature is typically 50° C. above the liquidus of the braze. A coarse matrix powder and a shorter infiltration path requires a lower excess temperature beyond the melting point of the braze.

The diamond braze must wet the diamond and chemically bond with the diamond. As discussed above, a carbide former dissolved in a suitable solvent alloy can meet this requirement. However, the reactivity of the carbide former must be balanced between diamond and oxygen or other gases such as nitrogen or hydrogen. It is a dilemma that a strong carbide former, such as titanium or zirconium that bonds diamond well are also gas scavengers. They would react quickly with harmful gases in the ambient atmosphere before forming the carbide with diamond. Most diamond tools are manufactured in a graphite mold often in air or in an inert gas. The minute amount of oxygen or moisture in the atmosphere may oxidize the carbide former so the latter may not bond to diamond. This is true even if the brazing is performed in a vacuum or in a hydrogen atmosphere, unless the vacuum is kept lower than $10^{-6}$ torr, or the dew point is kept below −60° C. Such a stringent requirement of vacuum or dew point often adds unnecessary cost to manufacturing.

On the other hand, if the reactivity is low, such as that of cobalt or nickel, the metal can be processed in graphite mold without being oxidized. However, it cannot bond to diamond either. Hence, there is a compromise for the carbide former between its ability to bond with diamond and its tendency to be oxidized.

In accordance with the present invention, it has been found that the preferred carbide former for the diamond braze is either cromium, manganese, silicon, aluminum and their alloys. The preferred total content of such carbide former is at least 3 percent, and more preferably at least 5 percent by weight. Examples of these brazes are NICROBRAZ LM (Ni—CR—BSi—Fe), manufactured by Wall Colmonoy Company (U.S.A.), with a melting range of 970–1000° C., and 21/80 (Cu—Mn—Ni), manufactured by Degussa (Germany), with a melting range of 970–990° C. Other possible brazes include: Cu—Mn alloy near the eutectic composition (about 25 wt % Mn) with a melting point of about 880° C.; Ni—Si alloy near the eutectic composition (about 50 wt % Si) with a melting point of about 970° C.; Cu—Si alloy near the eutectic composition (about 30 wt % Si) with a melting point of about 810° C.; Al—Si alloy near the eutectic composition (about 15 wt % Si) with a melting point of about2 600° C.

The above examples of infiltratable diamond brazes cover a wide range of mechanical properties and infiltration temperatures (generally about 50° C. above the liquidus). The alloys of them may also be used for further adjustments of infiltration temperature and mechanical properties. The selection of diamond braze depends on the intended application. In general, more severe applications, such as sawing granite, concrete, or asphalt) would require a stronger diamond grit that may tolerate a higher temperature of brazing. Brazes which melt at higher temperatures are, in general, more wear resistant. On the other hand, less demanding applications, such as sawing limestone or marble, require lower strength diamond grit. Such a diamond is degraded eaasily at high temperature so it must be brazed at a lower temperature. Brazes of this type are typically less wear resistant.

The sheets 100 may be first assembled to form the precursor of the tool segement and then infilrated with diamond braze, or they can be infiltrated by the braze and later assembled to form the tool segment or the entire tool body where appropriate. While the method described in FIGS. 5A through 5D is prefered for many applications, there are instances where it is desireable to have the abrasive particles 20 extend outwardly from the sheet 100 of matrix support material. For example, some tools may only have one layer of abrasive. This can be accomplished simply by leaving the template 110 in place when performing the steps shown in FIG. 5A and 5B, and not further pressing the particles 20 into the matrix support material once the template has been removed.

Figure 6A:
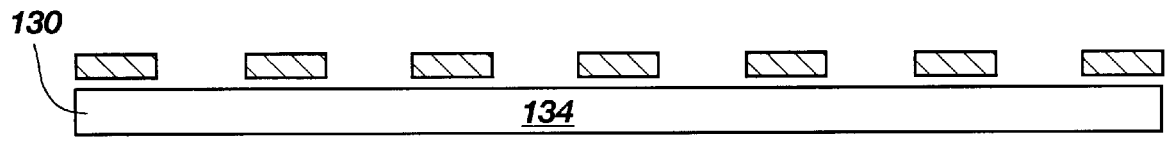
FIGS. 6A through 6C show an alternate method for forming one or more layers with controlled superabrasive distributuration.
Figure 6B:
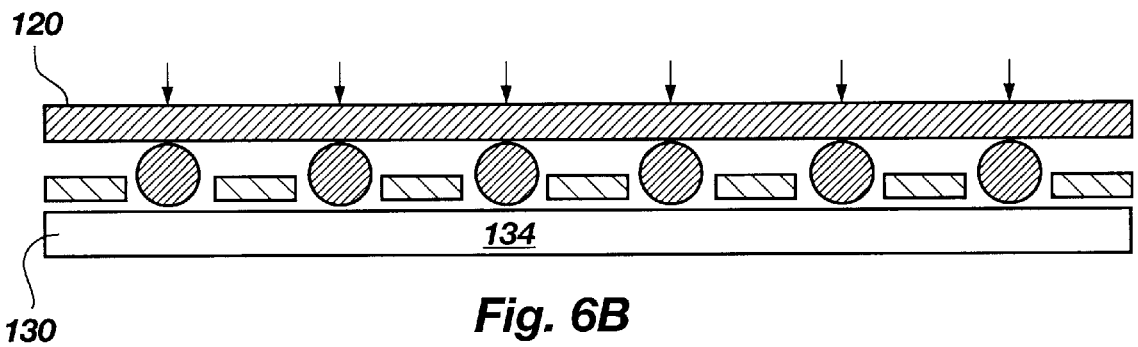
Figure 6C:
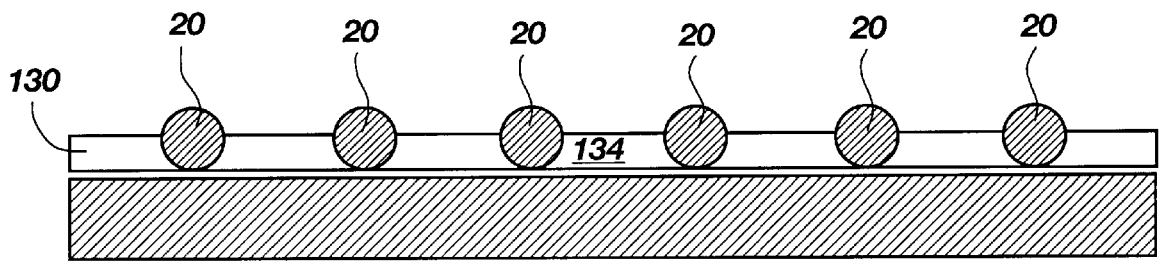

In the alternative, FIGS. 6A thorugh 6C show a side view of an alternate to the method discussed in FIGS. 5A through 5D. The sheet 130 of matrix support material in FIGS. 6A through 6C is formed to be of a lesser thickness than the cross-sectional thickness or diameter or the superabrasive particles 20. When the particles or pressed into the sheet 130, the thickness of the sheet forces the particles 20 to protrude from the matrix support material 134. The sheet 130 is then infiltrated with diamond braze in the manner discussed above.

While the use of the diamond braze 28 has been discussed with respect to the patterned distribution of diamond particles, it is equally applicable to the random distribution of diamond particles in a matrix support material. Once the diamonds have been placed in the matrix support material, a diamond braze comprising chromium, manganese, or silicon, and being substantially free of volatile metals, is melted and poured onto the matrix support material. The liquidous braze infiltrates the matrix support material and bonds the diamond particles to the matrix support material.

Figure 7A:
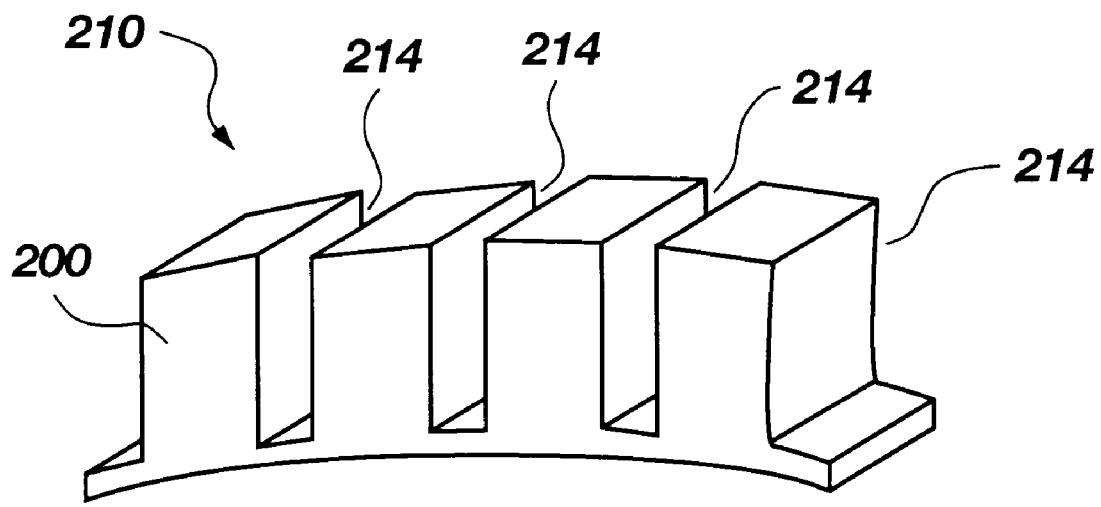
FIG. 7A shows a side view of a matrix support material formed in accordance with one aspect of the present invention, wherein a plurality of slots are formed in the matrix support material.
Figure 7B:
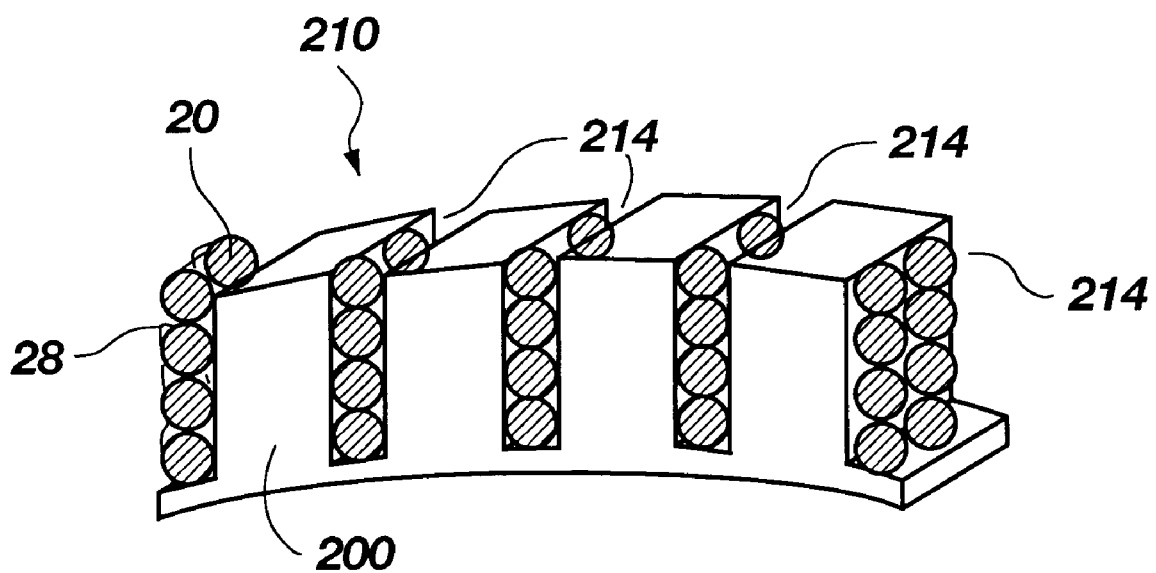
FIG. 7B shows a side view of the matrix support material of FIG. 7A, wherein a plurality of diamond particles are disposed in the slots and brazed to bond with the matrix support material and thereby form a plurality of abrasive fins in the matrix support material.

In addition to its use with conventional matrix support materials, such as metal powders, the diamond braze also facilitates the use of novel support materials, such as that shown in FIGS. 7A and 7B. Referring specifically to FIG. 7A, there is shown the matrix support material 200 of a saw segment, generally indicated at 210. The matrix support material 200 includes a plurality of slots 214 which are cut in specific intervals.

To form a finished cutting segment, the matrix support material 200 is placed in a mold made of refractory material (e.g., graphite). Diamond particles 20 (FIG. 7B) is poured into the slots 214 to fill the open slots. Diamond braze is added on top of these slots. After infiltration, the braze will fill in these slots and bond with the diamond particles 20, and with the matrix support material 200 for form a completed saw segment 210. In this geometry, the diamond particles form blades in the saw segment (FIG. 7B) instead of distributing throughout the matrix body as in the case of a conventional tool. Those skilled in the art will appreciate that such a configuration would be nearly impossible in accordance with the teachings of the prior art, because the matrix support material 200 was required to hold the diamond particles in place mechanically. In contrast, the use of the diamond braze enables the positioning of columns of diamond particles in a slot, hole, etc., because the braze bonds to the diamond and to the support material, the diamonds are secured in place. While the embodiment shown in FIGS. 7A and 7B forms diamond "fins", needlelike colums of diamond also can be formed. Furthermore, the slots, hole, etc, can be formed to provide such columns which are linear, or which curve in any desired direction. Thus, with routine experimentation, those skilled in the art can customize cutting, drilling, polishing, etc., segments which are customized to particular uses. The diamond particles used may be either diamond grit or thermally stable polycrystalline diamond (PCD). The infiltration will not only consolidate the matrix powder, but also bond the diamond firmly, so an integrated diamond tool is formed.

EXAMPLE 1

40/50 mesh diamond grit (SDA-85[+] made by De Beers Company) were mixed with iron powders and an organic binder to form a mixture with diamond concentration of 20 (5% of total value). The mixture was cold pressed in a steel mold to form the shape of a saw segment. The precursor was placed in a graphite mold and overlaid with a powder of Nicrobraz LM. The mold was heated under vacuum to about 1,050° C. for 20 minutes. The infiltrated braze had bonded diamond and matrix powder together for form a segment. Twenty-four of such segments were manufactured and they were trimmed to desirable tolerances. These segments were brazed onto a 14 inch round steel circular saw blade. The blade was used to cut granite at a faster cutting rate than was possible with conventional diamond saw blades. Additionally, the brazed saw blades had a longer useful life than a conventional diamond saw blade.

A distinct advantage cutting tools of the present invention have over the prior art cutting tools lies in the manner in which the tool may be used. Diamond saws are typically made in the form of a circular blade that cuts the workpiece by rotation in the same direction with each rotation. This one directional movement causes a "tail" to be formed, wherein the matrix material rotational forward of the diamond particle is worn away, but the matrix material behind the diamond particle is protected by the diamond particle itself. Thus, the matrix material behind the diamond continues to hold the diamond particle in place. If the saw rotation were to be reversed, the diamond particle could easily be knocked free of the matrix.

Round saws, however, can only cut the workpiece to a depth of less than one-half the diameter of the saw. In order to cut thicker workpieces, a frame or gang saw is typically used. Because these saws move reciprically, the diamond particles must be securely held on each side. As a result, tails of diamond matrix cannot be maintained to hold the diamond particles in place. It is for this reason that reciprocating diamond saws have not been used to saw hard rock, such as granite. Rather, they are used to cut only soft material such as marble.

This invention allows diamond to be held chemically by a braze. Hence, matrix tails are not needed to support the diamond. As a result, tools made according to the present invention can be used on reciprocating saws to cut hard materials. This breakthrough can expand diamond applications to markets which were previously unavailable due to the limications of the prior art.

Thus, there is disclosed an improved method for making diamond saw blades. The above description and examples are intended only to illustrate certain potential uses of this invention. It will be readily understood by those person skilled in the art that the present invention is susceptible of a broad utility and applications. Many embodiments and adaptations of the present invention other than those herein described, as well as many variations, modifications and equivalent arrangements will be apparent from or reasonably suggested by the present invention and the forgoing description thereof without departing from the substance for scope of the present invention. Accordingly, while the present invention has been described herein in detail in relation to its preferred embodiment, it is to be understood that this disclosure is only illustrative and exemplary of the present invention and is made merely for purpose of providing a full and enabling disclosure of the invention. The forgoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. An abrasive tool comprising:
   a matrix support material configured for holding diamond particles to be used as abrasives;
   a plurality of diamond particles disposed in the matrix support material in a predetermined pattern, and
   an alloy infiltrated through the matrix support material and the diamond particles, the alloy being bonded to the diamond particles and the matrix support materials, the alloy comprising a metal alloy that contains 2 to 50 percent of an element selected from the group consisting of chromium, manganese, silicon and aluminum.

2. An abrasive tool comprising:
   a matrix support material configured for holding diamond particles to be used as abrasives;
   a plurality of diamond particles disposed in the matrix support material that is formed by a plurality of diamond impregnated sheets, and
   an alloy infiltrated through the matrix support material and the diamond particles, the alloy being bonded to the diamond particles and the matrix support materials, the alloy comprising a metal alloy that contains 2 to 50 percent of an element selected from the group consisting of chromium, manganese, silicon and aluminum.

3. The abrasive tool according to claim 1 or 2, wherein the matrix support material contains more than 50% by weight of material selected from the group consisting of cobalt, nickel, iron, copper and bronze and mixtures and alloys thereof.

4. The abrasive tool according to claim 1 or 2, wherein the matrix support material occupies more volume than the diamond particles.

5. The abrasive tool according to claim 1 or 2, wherein the diamond particles are less than 40 percent of the volume of the matrix support material and diamond particles combined.

6. The abrasive tool according to claim 1 or 2, wherein the matrix support material is formed of coarse-sized powders greater than 400 U.S. mesh.

7. The abrasive tool according to claim 2, wherein at least one of the diamond impregnated sheets has been infiltrated with the alloy.

8. The abrasive tool according to claim 1 or 2, wherein the the alloy is substantially free of interfering metals from the group consisting of zinc, lead and tin.

9. The abrasive tool of claim 1 or 2, wherein the alloy comprises at least 3 percent by weight of a material selected from the group consisting essentially of chromium, manganese, silicon, and aluminum and mixtures and alloys thereof.

10. The abrasive tool according to claim 1 or 2 and characterized further in that the alloy is selected from the group consisting essentially of NICROBRAZ LM, copper-manganese alloy, copper-silicon alloy, and aluminum-silicon alloy.

11. The abrasive tool of claim 1 or 2, wherein the alloy has a liquidus temperature of less than 1,100° C.

12. The abrasive tool of claim 1 or 2, wherein the matrix support materials have a plurality of slots formed therein, and wherein the diamond particles are disposed within the slots.

13. The abrasive tool of claim 12, wherein the slots are filled with the alloy to bond the diamonds disposed within the slots to the matrix support material defining the slots.

14. The abrasive tool of claim 1 or 2, wherein the diamond particles are disposed in columns extending into the matrix support material, and wherein the diamonds are held in place by the alloy.

15. The abrasive tool of claim 14, wherein the column is substantially linear.

16. The abrasive tool of claim 14, wherein the column is curved.

17. The abrasive tool of claim 1 or 2, wherein the tool is a circular saw blade.

18. The abrasive tool of claim 1 or 2, wherein the tool is a linear saw blade capable of reciprocating motion.

* * * * *

(12) EX PARTE REEXAMINATION CERTIFICATE (5156th)
United States Patent
Sung

(10) Number: US 6,039,641 C1
(45) Certificate Issued: Jul. 19, 2005

(54) BRAZED DIAMOND TOOLS BY INFILTRATION

(75) Inventor: Chien-Min Sung, No. 4, Lane 32, Chung-cheng Rd., Tansui, Taipei County (TW)

(73) Assignee: Chien-Min Sung, Tansui (TW)

Reexamination Request:
No. 90/006,685, Jun. 25, 2003

Reexamination Certificate for:
Patent No.: 6,039,641
Issued: Mar. 21, 2000
Appl. No.: 08/835,117
Filed: Apr. 4, 1997

(51) Int. Cl.⁷ .................................. B24D 3/06
(52) U.S. Cl. .................... 451/540; 451/542; 125/22; 51/295; 51/307
(58) Field of Search .................. 451/540, 542; 125/21, 22; 51/307, 309, 295; 175/435, 434, 420.2

(56) References Cited

U.S. PATENT DOCUMENTS

| | | |
|---|---|---|
| 2,876,086 A | 3/1959 | Raymond |
| 3,630,699 A | 12/1971 | Catlin |
| 3,894,673 A | 7/1975 | Lowder |
| 4,018,576 A | 4/1977 | Lowder |
| 4,680,199 A | 7/1987 | Vontell |
| 4,883,500 A | 11/1989 | Deakins |
| 4,908,046 A | 3/1990 | Wiand |
| 4,916,869 A | 4/1990 | Oliver |
| 4,925,457 A | 5/1990 | deKok |
| 4,945,686 A | 8/1990 | Wiand |
| 5,000,273 A | 3/1991 | Horton |
| 5,022,895 A | 6/1991 | Wiand |
| 5,092,910 A | 3/1992 | deKok |
| 5,131,924 A | 7/1992 | Wiand |
| 5,133,782 A | 7/1992 | Wiand |
| 5,197,249 A | 3/1993 | Wiand |
| 5,203,881 A | 4/1993 | Wiand |
| 5,264,011 A | 11/1993 | Brown |
| RE35,812 E | 6/1998 | Oliver |

*Primary Examiner*—Eileen P. Morgan

(57) ABSTRACT

The present invention describes a diamond tool with diamond bonded chemically by a braze that contains either Cr, Mn, SI, or Al or mixtures or alloys thereof. The diamond tool is made by infiltrating the braze into a matrix metal that contains diamond in either form of grits or polycrystalline bodies.

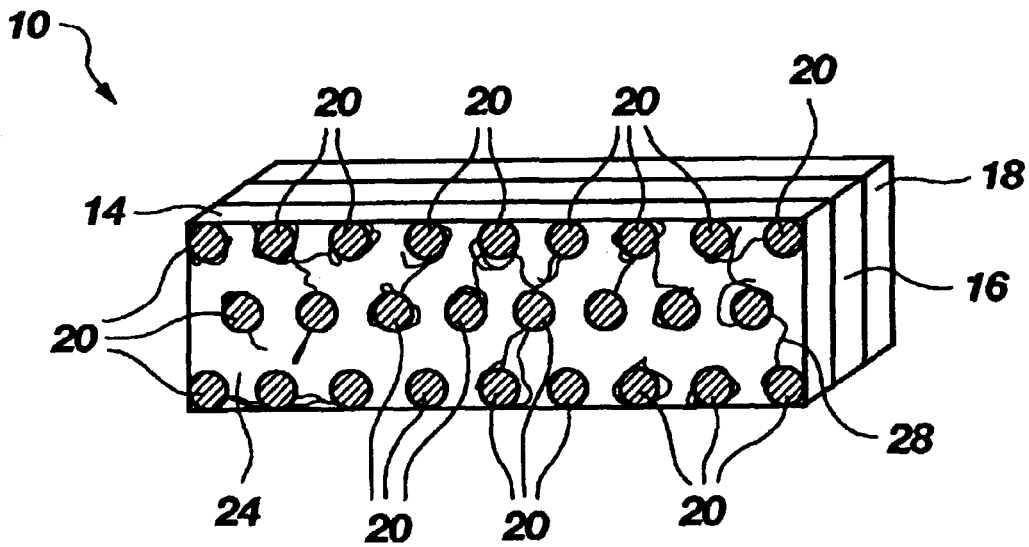

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4, 5, 12 and 14 are determined to be patentable as amended.

Claims 3, 6–11, 13 and 15–18, dependent on an amended claim, are determined to be patentable.

1. An abrasive tool comprising:
a matrix support material configured for holding diamond [particles] *grit* to be used as abrasives;
[a plurality of] diamond [particles] *grit* disposed in the matrix support material in a predetermined pattern; and
an alloy infiltrated through the matrix support material and the diamond [particles] *grit*, the alloy being bonded to the diamond [particles] *grit* and the matrix support materials, the alloy comprising a metal alloy that contains 2 to 50 percent of an element selected from the group consisting of chromium, manganese, silicon, and aluminum.

2. An abrasive tool comprising:
a matrix support material configured for holding diamond [particles] *grit* to be used as abrasives;
[a plurality of] diamond [particles] *grit* disposed in the matrix support material that is formed by a plurality of diamond impregnated sheets, *each diamond impregnated sheet having the diamond grit disposed therein in a predetermined pattern,* and
an alloy infiltrated through the matrix support material and the diamond [particles] *grit*, the alloy being bonded to the diamond [particles] *grit* and the matrix support materials, the alloy comprising a metal alloy that contains 2 to 50 percent of an element selected from the group consisting of chromium, manganese, silicon and aluminum.

4. The abrasive tool according to claim 1 or 2, wherein the matrix support material occupies more volume than the diamond [particles] *grit*.

5. The abrasive tool according to claim 1 or 2, wherein the diamond [particles] *grit* are less than 40 percent of the volume of the matrix support material and diamond [particles] *grit* combined.

12. The abrasive tool of claim 1 or 2, wherein the matrix support materials have a plurality of slots formed therein, and wherein the diamond [particles] *grit* are disposed within the slots.

14. The abrasive tool of claim 1 or 2, wherein the diamond [particles] *grit* are disposed in columns extending into the matrix support material, and wherein the diamonds are held in place by the alloy.

* * * * *